(12) United States Patent
Van Ginneken et al.

(10) Patent No.: US 8,440,759 B2
(45) Date of Patent: May 14, 2013

(54) PEELABLE TEMPORARY COATING

(75) Inventors: Mark Johannes Maria Van Ginneken, Leiderdorp (NL); Edward Marinus, Leiden (NL); Petrus Henricus De Bruin, Voorhout (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 572 days.

(21) Appl. No.: 12/602,556

(22) PCT Filed: Jun. 3, 2008

(86) PCT No.: PCT/EP2008/056853
§ 371 (c)(1),
(2), (4) Date: Dec. 1, 2009

(87) PCT Pub. No.: WO2008/148763
PCT Pub. Date: Dec. 11, 2008

(65) Prior Publication Data
US 2010/0183901 A1    Jul. 22, 2010

Related U.S. Application Data

(60) Provisional application No. 60/942,602, filed on Jun. 7, 2007.

(30) Foreign Application Priority Data

Jun. 5, 2007    (EP) .................................. 07109629

(51) Int. Cl.
*C09B 67/00*    (2006.01)
*C08G 18/42*    (2006.01)

(52) U.S. Cl.
USPC .......................................... 524/502; 524/500

(58) Field of Classification Search .................. 524/502
See application file for complete search history.

(56) References Cited

U.S. PATENT DOCUMENTS

| 5,985,986 | A * | 11/1999 | Kubitza et al. ................ 524/591 |
| 6,299,944 | B1 * | 10/2001 | Trapani ......................... 427/493 |
| 6,964,989 | B1 * | 11/2005 | Fang et al. .................... 524/145 |
| 7,005,470 | B2 * | 2/2006 | Probst et al. ................... 524/507 |
| 2003/0203146 | A1 * | 10/2003 | Nakanishi .................... 428/40.1 |
| 2004/0068036 | A1 | 4/2004 | Halladay et al. |

FOREIGN PATENT DOCUMENTS

| DE | 199 21 885 | 11/2000 |
| EP | 1 477 236 | 11/2004 |
| WO | WO 02/42386 | 5/2002 |
| WO | WO 03/076537 | 9/2003 |

OTHER PUBLICATIONS

International Search Report and Written Opinion of the International Searching Authority, PCT International Application No. PCT/EP2008/056553, dated Sep. 16, 2008.
International Preliminary Report on Patentability, PCT International Application No. PCT/EP2008/056853, dated Dec. 7, 2009.
European Search Report, European Application No. 07 10 9629, dated Nov. 22, 2007.

* cited by examiner

*Primary Examiner* — Hui Chin
(74) *Attorney, Agent, or Firm* — Kenyon & Kenyon LLP

(57) ABSTRACT

The invention relates to an aqueous coating composition for forming a peelable temporary coating on a substrate, said aqueous coating composition comprising at least one water based film-forming polymer, characterized in that the composition additionally comprises solid particles of an amino resin based polymer.

13 Claims, No Drawings

PEELABLE TEMPORARY COATING

REFERENCE TO RELATED APPLICATION(s)

This application is the U.S. National Phase of PCT/EP2008/056853 filed on Jun. 3, 2008 and claims the benefit of U.S. Provisional Application No. 60/942,602 filed on Jun. 7, 2007.

The invention relates to an aqueous coating composition for forming a peelable temporary coating on a substrate, to a process for forming a peelable temporary coating on a substrate, and to a coated substrate.

A coating composition of the above-mentioned type is known from German patent application DE 19921885 A. The known composition comprises a polymer dispersion and inorganic mineral filler particles. When applied to a non-porous substrate, the composition forms a film with an internal cohesion which is higher than its adhesion to the substrate. The temporary coatings prepared from the composition are effective for protecting exposed surfaces of various products and components and can be removed by peeling.

Such coatings are suitable for temporary protection and/or decoration of motor vehicles and components thereof. The surface paint finishes of new vehicles are subject to various types of damage both during the assembly process and during transportation from the assembly plant to retail locations. Typical sources of damage include acid rain, bird droppings and "rail dust", a cloud of hard, abrasive particles which rises from a rail bed as a train passes over the rails, or from the electrical pick-ups scraping on the overhead power lines. Rail dust is an especially difficult problem for car manufacturers as many cars are transported from assembly plants or dockyards to retail markets by rail. In addition to new vehicles, other products are also subjected to abrasive and deleterious conditions during transit, as well as during fabrication and assembly into other products. For instance, storm windows and other glass products must be specially protected to avoid scratching and marring during road and rail transit. Deck cargo is also susceptible to surface damage caused by salt water and other factors. Similarly, many products must be protected during fabrication or assembly by downstream manufacturers. For example, plastic laminates and other materials with high-gloss finishes such as bathroom fixtures and chrome plated or brass surfaces must be protected not only during shipping, but also during installation or assembly into other products.

There is an ongoing need for improving the properties of temporary coatings, in particular with respect to improved mechanical properties of the coating layer leading to better peelability upon removal, and also with respect to durability of the temporary coating upon outdoor exposure, especially water resistance. Accordingly, the present invention seeks to provide a coating composition for forming peelable temporary coatings meeting these needs.

The invention now provides an aqueous coating composition for forming a peelable temporary coating on a substrate, said aqueous coating composition comprising at least one water based film-forming polymer, and the composition additionally comprises solid particles of an amino resin based polymer.

It has been found that solid particles of an amino resin based polymer as additive in a water borne coating composition improve the peelability of the temporary coating layer. In many cases, the water resistance is additionally improved.

The coating composition according to the invention leads to temporary coatings which are easy to remove by peeling when the temporary protective coating is no longer needed. Generally, the coatings also have a good water resistance.

The selection of water based film-forming polymers determines, at least in part, the ease of removal of the temporary coating by peeling. Generally, film forming polymers having a low glass transition temperature (Tg) are preferred. Suitable film forming polymers may have a Tg of 19° C. or below, or 13° C. or below, or 9° C. or below. Generally, the film forming polymers will have a Tg of −30° C. or higher, or −25° C. or higher.

The flexibility of the temporary coating likewise has a favourable effect on its peelability. For that reason preferably use is made of a paint composition giving a coat of paint which after drying has a modulus of elasticity of 80 MPa or less, or 50 MPa or less. Good results are also obtained when the modulus of elasticity of the coat of paint is at most 20 MPa. Generally, the modulus of elasticity of the coat of paint is at least 9 MPa, or at least 10 MPa. The elongation at break of the temporary coating is likewise relevant for good peelability. Generally, the elongation at break of the temporary coating is at least 400%, or at least 500%, or even at least 600%, so as to prevent premature breaking of the coating as it is peeled from the substrate. A too high elongation at break is not favourable for peelability. The elongation at break suitably does not exceed 1,000%, preferably it does not exceed 900%. So far very good results have been achieved when the modulus of elasticity is in the range of 5 to 12 MPa, with an elongation at break in the range of 500% to 800%.

Examples of suitable water based film-forming polymers are polyurethanes, polyesters, polycarbonates, and polymers prepared by polymerization of olefinically unsaturated monomers, such as poly(meth)acrylates or copolymers of vinyl acetate. It is also possible to use mixtures and/or hybrids of these types of film-forming polymers. Preparation of the water based film-forming polymers is carried out by conventional techniques. It is possible to prepare the polymer in the absence of water, followed by dissipation in water. Alternatively, the polymer can be prepared in an aqueous environment, for example by emulsion polymerization. In one embodiment, the coating composition of the invention comprises at least two different water based film-forming polymers.

Suitable water based film-forming polymers are available commercially, such as Revacryl® 274, an aqueous dispersion of an acrylic ester-acrylonitrile copolymer ex Synthomer, Emultex® AC 430, an aqueous dispersion of a vinyl acetate-butyl acrylate copolymer ex Synthomer, Plextol® B 500, an aqueous dispersion of a methacrylic ester-acrylic ester copolymer ex Polymer Latex, or NeoRez® R987, an aqueous polyurethane dispersion ex DSM Neoresins.

The solid particles of an amino resin based polymer are generally present in the coating composition in an amount of at least 1, or at least 2, or even at least 4% by weight, calculated on the total weight of the composition. The upper limit of the amount of the particles suitably is 25%, or 20%, or 14% by weight, calculated on the total weight of the composition. The average particle size generally is in the range of 1 μm to 150 μm. The particles used generally have a particle size distribution. For example, 90% of all particles may be smaller than 14 μm, and 50% of all particles may be smaller 6.5 μm.

In one embodiment, the lateral dimension and the longitudinal dimension of the particles may be of a similar order. The particles may for example be essentially of spherical shape. However, the particles may also have other shapes, for example a platelet shape or a needle shape.

The amino resin based polymer can suitably be prepared by condensation reactions of amino resins or amino resin precursors with formaldehyde or by other condensation and/or addition reactions of amines. Examples of suitable amino resin based polymers are guanidine based polymers, melamine based polymers, urethane based polymers, amide based polymers, and urea based polymers, in particular methyl urea based polymers. The amino resin based polymer suitably is crosslinked, i.e. the polymer is a duroplast. Crosslinking can occur in the condensation reaction of the amino resin with formaldehyde. However, crosslinking can also be caused by additional crosslinking agents. Suitable solid particles of amino resin based polymer are commercially available, for example under the trade designation Deuteron® MK ex Deuteron GmbH, Germany. The Deuteron® MK particles are based on methyl urea polymer.

The invention also relates to the use of solid particles of an amino resin based polymer as additive in a water borne coating composition for forming a peelable temporary coating on a substrate, for improving the peelability of the temporary coating layer.

The major part of the volatile content of the coating composition of the present invention consists of water. However, the coating composition can contain one or more organic solvents, with the proviso that the volatile organic content (VOC) of the ready-for-use coating composition does not exceed 420 g/l. Preferably, it does not exceed 210 g/l. The presence of such organic solvent can facilitate coalescence of the dispersed polymer particles to form a homogeneous film. Therefore, such solvents are frequently referred to as coalescing agents. As suitable coalescing agents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxy ethyl propionate, toluene, xylene, methylethyl ketone, methyl isobutyl ketone, methyl isoamyl ketone, ethyl amyl ketone, dioxolane, N-methyl-2-pyrrolidone, dimethyl carbonate, 2,2,4-trimethyl-1,3-pentanediol monoisobutyrate, propylene carbonate, butyrolactone, caprolactone, and mixtures thereof.

The coating composition according to the invention can further comprise other components and additives conventionally present in coating compositions, such as pigments, extenders, colouring agents, pigment dispersants, emulsifiers (surfactants), rheology-controlling agents, levelling agents, flatting agents, wetting agents, anti-cratering agents, anti-foaming agents, biocides, plasticizers, UV absorbers, light stabilizers, and odour masking agents.

To achieve a desired colour, the coating composition may contain one or more pigments. The pigments can be either organic or inorganic. The pigment content generally is in the range of 1 to 20% by weight, calculated on the weight of the film-forming polymer. Alternatively or additionally, the coating composition can contain one or more dyes which are wholly or partially soluble in the composition.

The invention also relates to a process of forming a temporary coating on a substrate, wherein a coating composition according to the invention is applied to the substrate and allowed to form a peelable temporary coating layer on the substrate. In one embodiment, the process additionally comprises removing the temporary coating layer by peeling.

Any known methods for applying coating compositions to a substrate can be used for applying the coating composition. Examples of such application methods are spreading (e.g., brushing, rolling, by paint pad or doctor blade), spraying (e.g., airfed spraying, airless spraying, hot spraying, and electrostatic spraying), flow coating (e.g., dipping, curtain coating, roller coating and reverse roller coating), and electrodeposition.

Coating layers prepared from the composition of the current invention can be dried between 0 and 160° C., or between 5 and 80° C., or between 10 and 60° C., for example at ambient temperature. Drying at elevated temperature can be carried out in an oven. Alternatively, drying can be supported by infrared and/or near radiation.

The coating composition is very suitable for forming a temporary protective coating on a substrate. However, alternatively or additionally, the coating composition may also be used for temporary decorative purposes, in particular when the composition additionally comprises pigments. For forming a temporary coating layer the composition is applied to a substrate and allowed to form a peelable temporary coating layer. As mentioned further above, temporary protective coatings may be needed for temporary protection of substrates during and/or between assembly processes or during transport. Temporary decoration may be desired for giving motor vehicles a specific appearance and colour during festive events. When the need for temporary protection and/or decoration of a substrate no longer exists, the temporary coating layer can be removed by peeling the coating layer off the substrate.

The substrate suitably is a non-porous substrate. Examples of suitable non-porous substrates are metals which may have been pre-treated or not, pre-treated wood, synthetic polymeric materials, and glass. Further suitable substrates are other coats of paint, such as are present on transportation vehicles and motor vehicles or parts thereof, e.g., passenger cars, bicycles, trains, trucks, buses, and airplanes.

EXAMPLES

Raw materials used

| | |
|---|---|
| AC 430 | Emultex ® AC 430, Aqueous dispersion of a vinyl acetate-butyl acrylate copolymer ex Synthomer |
| R 274 | Revacryl ® 274, Aqueous dispersion of an acrylic ester-acrylonitrile copolymer ex Synthomer, |
| P B500 | Plextol ® B500, Aqueous dispersion of a methacrylic ester-acrylic ester copolymer ex Polymer Latex |
| R987 | NeoRez ® R987, Aqueous polyurethane dispersion ex DSM Neoresins |
| D MK | Deuteron ® MK, Amino resin based polymer particles ex Deuteron |
| Texanol ® | 2,2,4-trimethyl-1,3-pentanediol monoisobutyrate |
| BYK ® 333 | Surface-active additive ex BYK Chemie |
| Colorant | Commercially available toner composition comprising pigments |

The coating compositions of Examples 1 to 3 and comparative Examples A to C were prepared by mixing the components in the weight proportions indicated in Table 1:

| | 1 | A | 2 | B | 3 | C |
|---|---|---|---|---|---|---|
| AC 430 | 36.94 | 37.88 | — | — | — | — |
| R274 | 45.15 | 46.29 | — | — | — | — |
| P B500 | — | — | 82.68 | 85.49 | — | — |
| R987 | — | — | — | — | 82.60 | 86.49 |
| Water | — | — | — | — | 1.61 | 1.69 |
| BYK ® 333 | — | — | — | — | 1.37 | 1.43 |
| Colorant | 12.98 | 13.31 | 13.91 | 13.65 | 9.92 | 10.38 |
| Texanol ® | 2.46 | 2.53 | 0.83 | 0.85 | — | — |
| D MK | 2.46 | — | 2.59 | — | 4.50 | — |
| E-mod. of dried film | 21 MPa | 4 MPa | 10 MPa | 3 MPa | 50 MPa | 8 MPa |

Coating compositions 1 to 3 according to the invention contain solid particles of an amino resin based polymer. Comparative compositions A to C do not contain such particles. The liquid coating compositions were applied to metal panels precoated with automobile coatings comprising a base coat and a clear top coat. Application took place by air-assisted spraying with a Devilbiss spray gun. When application by rolling or brushing is contemplated, a thickener, and optionally a defoamer, can suitably be added. The coatings were allowed to dry at room temperature for two hours or at 60° C. for 30 minutes. The dry layer thickness was 50-90 p.m. After 1 day the applied coatings were removed by manual peeling. The peelability was determined by a test in which a group of people peeled the films manually. The coatings from Examples 1 to 3 were found to exhibit an improved peelability in comparison with Examples A to C, respectively. Thus, it has been demonstrated that the addition of solid particles of an amino resin based polymer leads to better peelability upon removal of temporary coatings. It can also be inferred from Table 1 that the modulus of elasticity is significantly increased by the addition of solid particles of an amino resin based polymer Water sensitivity of the temporary coatings was determined by 7 days water immersion. The coatings of Examples 1 and 3 were found to have an improved water resistance over comparative Examples A and C, respectively. Thus, it has been demonstrated that the addition of solid particles of an amino resin based polymer can improve the water resistance of temporary coatings.

The invention claimed is:

1. An aqueous coating composition comprising at least one water based film-forming polymer, wherein the composition additionally comprises solid particles of an amino resin based polymer, and wherein the aqueous coating composition forms a peelable temporary coating on a substrate.

2. The aqueous coating composition according to claim 1, wherein the amino resin based polymer is a methyl urea based polymer.

3. The aqueous coating composition according to claim 1, wherein the amino resin based polymer is a crosslinked polymer.

4. The aqueous coating composition according to claim 1, wherein the solid particles of an amino resin based polymer are present in an amount of 1 to 25% by weight, based on the weight of the total composition.

5. The aqueous coating composition according to claim 1, wherein the composition additionally comprises a coalescing agent.

6. The aqueous coating composition according to claim 1, wherein the water based film-forming polymer is a (meth) acrylate based copolymer.

7. The aqueous coating composition according to claim 1, wherein the composition comprises at least two different water based film-forming polymers.

8. A process of forming a temporary coating on a substrate, the process comprising applying the coating composition according to claim 1 to the substrate and allowing the coating composition to form a peelable temporary coating layer on the substrate.

9. The process according to claim 8, wherein the process additionally comprises removing the temporary coating layer by peeling.

10. A substrate coated with a peelable temporary coating, wherein the peelable temporary coating is obtained from a coating composition according to claim 1.

11. The substrate according to claim 10, wherein the substrate is a motor vehicle or a part thereof.

12. A method for improving the peelability of a temporary coating layer, the method comprising adding solid particles of an amino resin based polymer to a water borne coating composition according to claim 1 for forming a peelable temporary coating on a substrate.

13. The aqueous coating composition according to claim 1, wherein the peelable temporary coating formed therefrom has an elongation at break of at least 400%.

* * * * *